Feb. 21, 1956      B. K. BREED      2,735,381
OIL FIRED BAKE OVEN
Filed Nov. 25, 1952      3 Sheets-Sheet 1
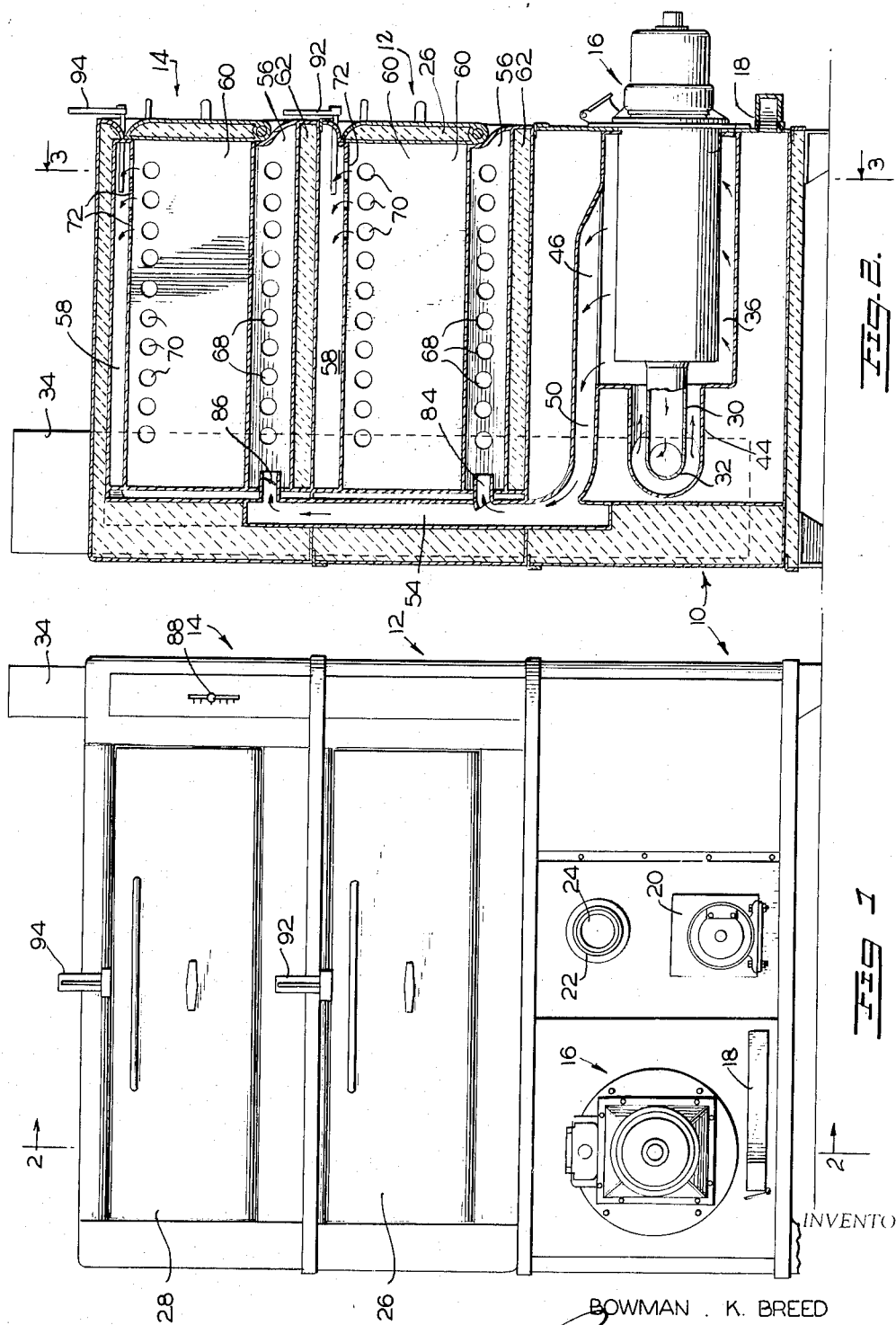
INVENTOR
BOWMAN K. BREED
BY Richard L. Underwood
ATTORNEY

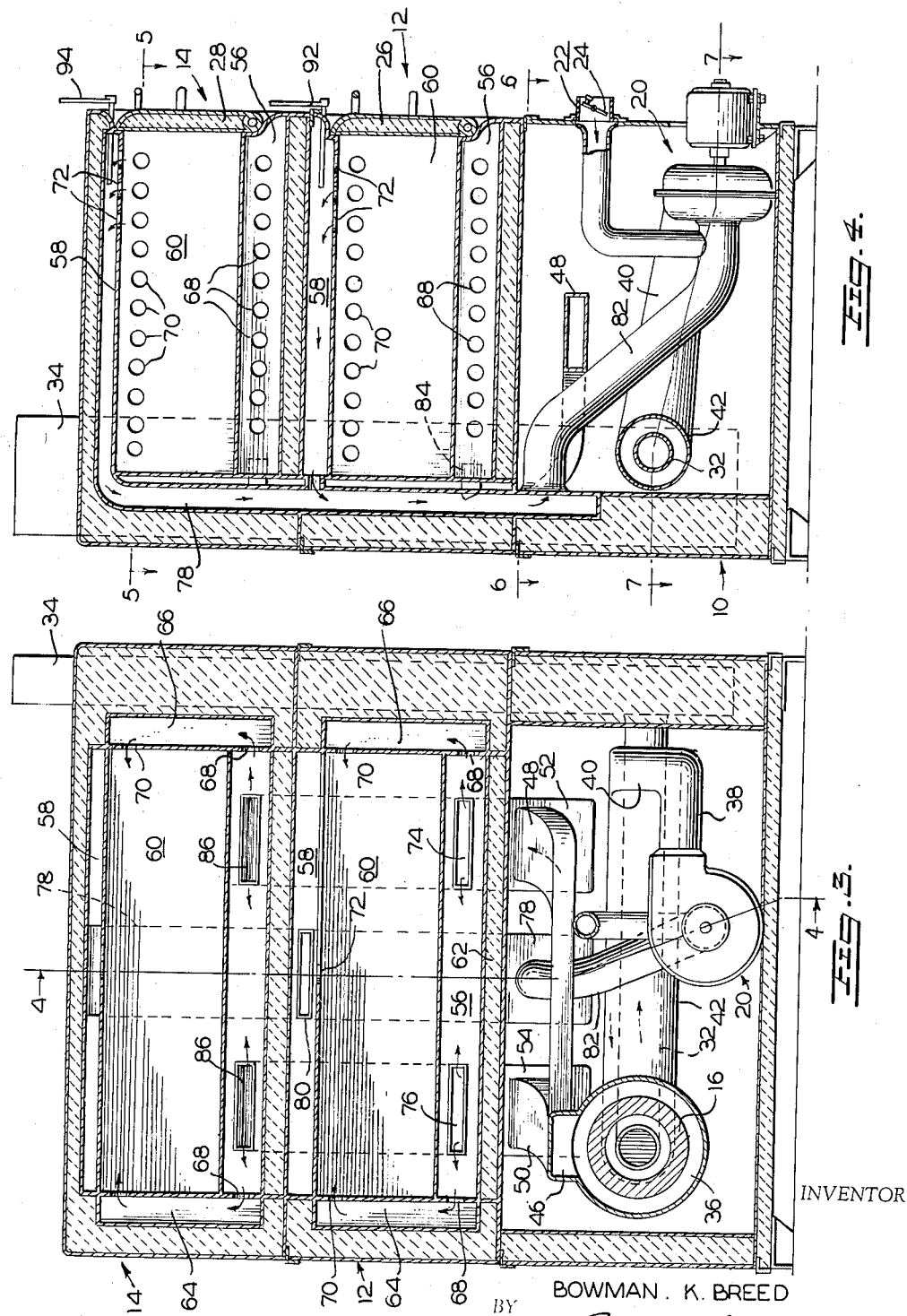

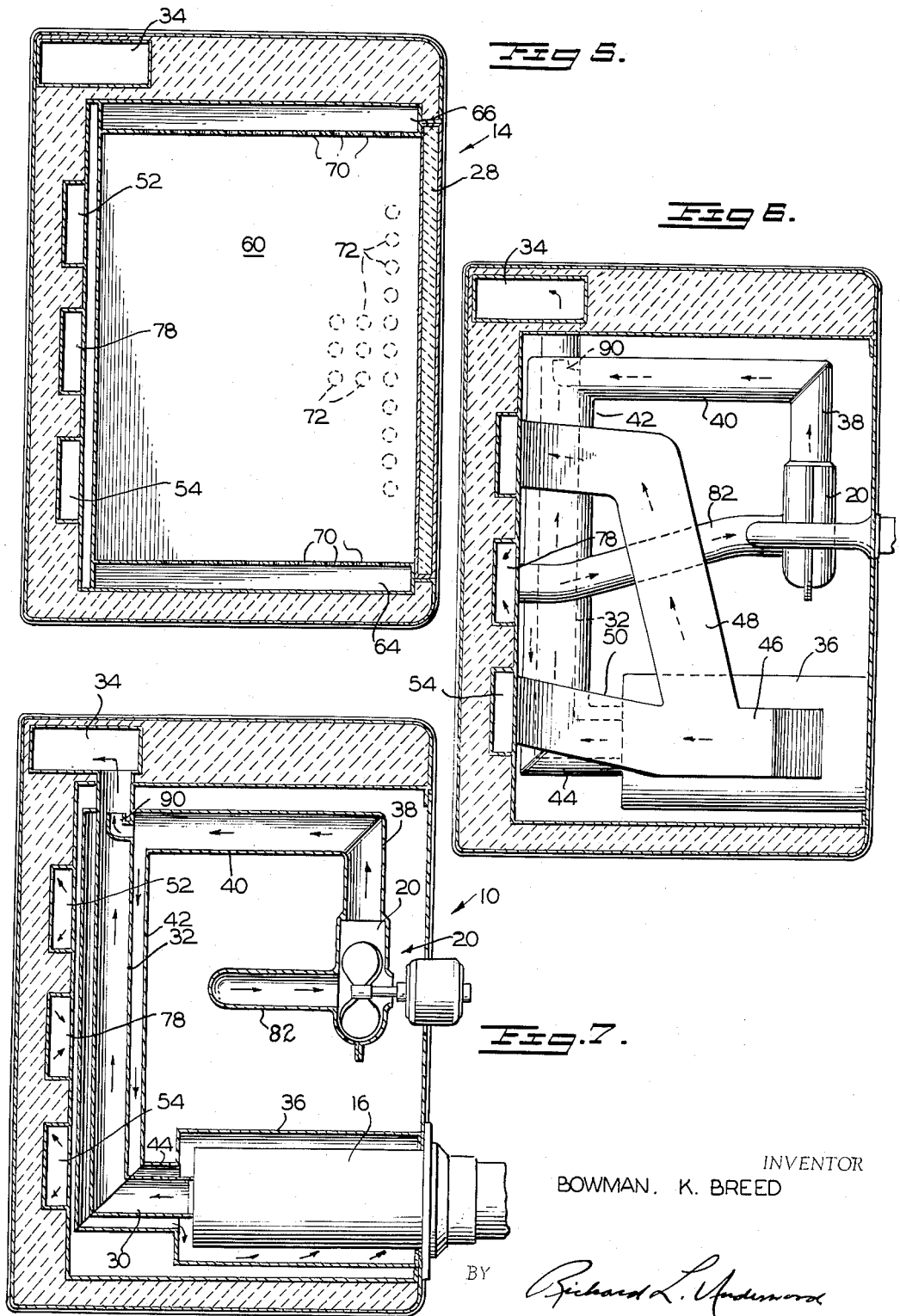

United States Patent Office 2,735,381
Patented Feb. 21, 1956

2,735,381

OIL FIRED BAKE OVEN

Bowman K. Breed, Chicago, Ill., assignor to Preferred Utilities Manufacturing Corporation, New York, N. Y., a corporation of Delaware Application November 25, 1952, Serial No. 322,525

5 Claims. (Cl. 107—55)

This invention relates to bake ovens using forced circulation of heated air. For purposes of illustration, the oven is being shown and described in conjunction with a heat source in the form of an oil fired burner.

A particular object of the invention is to circulate heated air efficiently in and around the walls of a baking compartment, and in the compartment itself, to thereby supply an even distribution of heat for baking purposes.

Heretofore reliance has been placed in ovens of this sort primarily on heat supplied by convection. One difficulty in arrangements of this sort lies in the fact that it is impossible to build up heat quickly in the oven compartment. Each time an oven is loaded with a batch of bread or pastry, the oven temperature necessarily drops due to opening the doors and to the fact that the load of pastry and pans absorbs considerable heat. To rebuild this heat quickly, the tendency has been to run the oil burner, or other source of heat, at over-capacity, and thereby overheat the air which moves up through the oven compartment by natural convection. The air thus overheated, together with the unnecessarily high stack temperature acting in the flue, tends to scorch the product near the sides of the baking compartment.

Among the objects of this invention is to circulate larger quantities of air through the baking compartments at lower temperatures than have heretofore been possible. In this way more heat units are conveyed into the compartment and the product therein within a given period of time without overheating either the product or the compartment.

Where convection is used to obtain movement of the heated air, there is insufficient velocity to control the distribution of the heated air within the various oven compartments. The use of forced air distribution, broadly, is not new in connection with oven construction. A further object of this invention, however, is to provide efficient recirculation of heated air at controlled velocities and to obtain maximum efficiency of heat transfer through the particular arrangement of heat transfer surfaces embodied in the construction which will be described.

Still another object of the invention is to efficiently preheat the air in the course of its travel prior to actual heat transfer from the source of heat, and to this end the flue or stack gases are utilized in efficient manner.

Yet another object of the invention is to eliminate the need for any substantial elevation of the stack or exhaust flue and to this end part of the circulating air is utilized to create an induced draft in the exhaust flue.

Various other objects and meritorious features of the invention will become apparent from the following description taken in conjunction with the drawings wherein like numerals designate like parts throughout the several figures and wherein:

Fig. 1 is a front elevation of my improved oven assembly;
Fig. 2 is a section through line 2—2 of Fig. 1;
Fig. 3 is a section through line 3—3 of Fig. 2;
Fig. 4 is a section through line 4—4 of Fig. 3;
Fig. 5 is a section through line 5—5 of Fig. 4;
Fig. 6 is a section through line 6—6 of Fig. 4, and
Fig. 7 is a section through line 7—7 of Fig. 4.

The assembly illustrated in Fig. 1 comprises a conditioning base section broadly indicated by the numeral 10 and two oven units broadly designated by the numerals 12 and 14 superimposed thereover. An oil burner assembly illustrated in somewhat schematic form is shown at 16, beneath which is shown an adjustable secondary air damper 18. In the central portion of the forward part of the conditioning unit 10 is mounted a motor-driven blower assembly broadly indicated by the numeral 20, above which is located a make-up air inlet 22 controlled by an automatic damper plate 24. The function and purpose of the make-up inlet will be brought out clearly hereinafter.

The walls of each unit are constructed in any suitable heat insulating fashion, and the units are preferably so designed that one may be superimposed upon another to provide any feasible number of oven units in vertical alignment with one another and above the conditioning unit 10. These units are assembled preferably by the manufacturer to provide a composite unit embodying a desired number of oven compartments. Each oven compartment is provided with a closure such as the swinging front oven doors 26 and 28.

The oil burner 16 may be of any suitable type, and the combustion chamber thereof communicates with a waste gas duct which includes the portion 30 extending back toward the rear of the conditioning unit and a second horizontal section 32 which extends across the rear of the conditioning unit into communication with a vertically disposed stack 34 through which the waste gas escapes.

Surrounding the integrated burner and combustion chamber which, as has been stated, is designated broadly by the numeral 16, is a heating chamber 36. Air from within the various oven compartments is withdrawn therefrom by the blower assembly broadly designated by the numeral 20, through channels hereafter to be described, and forced through duct sections 38 and 40 into a section 42 which envelopes or jackets section 32 of the waste gas flue. The annular passageway thus formed is continued through section 44 of the air duct which discharges into the heating chamber 36.

The heating chamber 36 is provided with a discharge outlet 46 which communicates through branch ducts 48 and 50 with hot air ducts 52 and 54, respectively, which extend vertically upwardly through the rear walls of the oven section.

Each oven section embodies a lower plenum compartment or space 56 and an upper plenum compartment or space 58 which, respectively, extend across the entire bottom and the entire top of the oven compartments 60 to which access is had through doors 26 and 28. The individual oven sections are separated from one another by insulated partitions indicated at 62.

Plenum compartments or spaces 64 and 66 extend across the respective side walls of each oven compartment 60 and communicate with lower plenum spaces 56 through openings shown at 68. Openings 70 in the top of each side wall of oven compartments 60 provide communication between the interior thereof and the side wall plenum spaces 64 and 66, respectively. Openings 72 provide communication between the interior of the oven compartments 60 and upper plenum spaces 58.

The two warm air up-draft ducts 52 and 54 communicate with lower plenum spaces 56 through openings 74 and 76, respectively. The upper plenum spaces 58 communicate with a relatively cool air down-draft duct 78 through openings 80. The down-draft cool air duct 78 communicates at its base through duct 82 with the casing of blower 20.

In each of the up-draft ducts 54 and 52 at openings 74 and 76 there is an air scoop 84 which facilitates passage of hot air into the lower plenum space 56. At the openings from these up-take ducts into the plenum space 56 in the upper oven section 60 is a damper 86 which facilitates control of circulation through and around both oven compartments. The damper may be operated through a linkage system not shown by a manually operable member 88 to control the amount of heat entering the top oven which in turn automatically governs the amount of heat supplied to the lower oven.

Extending into flue section 32 adjacent the point where it emerges from within section 42 of the so-called cold air duct is an air nozzle 90. A portion of the air passing through air duct section 40 issues through nozzle 90, which is directed toward the exhaust stack 34, and thereby creates an induced draft from the combustion chamber of burner 16 to facilitate exhaust of the gases through stack 34. This eliminates the need for any substantially elevated stack, which is an important factor where installations are made in limited spaces such as ship galleys, tents, barracks, etc.

Any loss of desirable air volume in the circulating system which results from discharge through nozzle 90 may be compensated for through adjustable air make-up intake 22 which communicates with the casing of blower 20.

Thus it will be seen that heated air is taken from chamber 36 and circulated about and within the various compartments as a result of pressure created by the small motor-driven blower. This forced circulation permits handling of air at a lower temperature than is otherwise possible, and also permits accurate control of distribution throughout the oven assembly. Air is withdrawn from the oven compartments through duct 82 into the blower 20 and thence forced through duct sections 38 and 40 to duct section 42 which envelops the smoke pipe or exhaust flue 32. Under such circumstances the air in duct section 42 immediately begins to pick up heat since the exhaust flue 32 provides an added heat transfer surface embodying also the counterflow principle.

The preheated air then passes into heating compartment 36, where additional heat is transferred to it from the furnace proper, and in the form of superheated air is conducted through ducts 48 and 50 to the hot air uptakes 52 and 54 located in the rear of the oven compartments.

The hot air from these uptakes passes through openings 74 and 76 into the plenum spaces 56 below each oven compartment and thence through openings 68 into plenum spaces 64 and 66 adjacent opposite side walls of the oven compartment. From there the heated air passes through opening 70 into the top of the oven compartment itself and thence out through openings 72 and 80 into the downtake duct 78 from which it passes through duct 82 back into the blower casing for recirculation in the manner just described.

Such an arrangement permits circulation of large quantities of air through the oven compartments at lower temperatures than heretofore possible, thus conveying into the compartments and products therein more heat units within a given time without overheating any portion of the compartment or product therein.

By reason of the velocity factor involved in such a circulatory system, as distinguished from convection or drifting, distribution within the various compartments can be controlled, and all parts of each oven compartment may therefore be held to the same temperature. Control of velocity is through the blower, and distribution within the system may be controlled by means of damper 86.

The entire bottom and top expanse of each oven compartment is heated as well as the side walls thereof in their entirety. The back of each oven compartment is heated by radiation from the uptakes 52 and 54 as well as by the downtake 78. While the downtake has been described as conducting cool air, it will be obvious that this is a matter purely of degree and that the air flowing through the downtake duct 78 is heated to a substantial extent. The circulation of air within the compartments is excellent because the air therein is under a substantial velocity, but the primary air entering the oven compartments through openings 70 supplies in a large measure the top heat required for the baking process.

By forcing air under pressure through the restricted heat transfer passages, overheating of any part of the stove is precluded, and heat is transferred to the air more efficiently with any given amount of heating surface. Thus an increased life of the usually vulnerable parts of the oven is attained, together with a greater overall efficiency of operation.

The construction herein described has been shown through experience to bake twice as much product within a given time, since the heat input is much more rapid and there is no time delay required for the oven to catch up following a loading period. Furthermore, baking costs insofar as fuel consumption is concerned are far less than have heretofore been possible, due to the recovery of heat resulting from the recirculation system.

Heat indicators 92 and 94 may be inserted in upper plenum spaces 58 for visual observance by the operator, thus enabling him to accurately control the situation within individual oven compartments through use of the damper and control of the blower.

While I have described a preferred embodiment of the invention for purposes of illustration, various modifications will be apparent to those skilled in the art and for that reason I wish to limit myself only within the scope of the appended claims.

What I claim is:

1. A bake oven comprising an oven compartment, a heat source, a blower, a duct from the blower to the heat source, a waste gas flue from said heat source, said heat source and said flue being jacketed by portions of said duct, plenum space surrounding a portion of said oven compartment, a duct from the jacket surrounding said heat source to a portion of said plenum space, passages through the oven compartment walls providing communication between the interior of said oven compartment and said plenum space, a duct from said plenum space to said blower, and a nozzle extending from a jacketing portion of said duct into said flue in the direction of waste gas travel.

2. A bake oven comprising an oven compartment, a heat source, a blower, a duct from the blower to the heat source, a waste gas flue from said heat source, said heat source and said flue being jacketed by portions of said duct, plenum space surrounding a portion of said oven compartment, a duct from the jacket surrounding said heat source to a portion of said plenum space, passages through the oven compartment walls providing communication between the interior of said oven compartment and said plenum space, a duct from said plenum space to said blower, a nozzle extending from a jacketing portion of said duct into said flue in the direction of waste gas travel, a make-up air duct extending from atmosphere to the blower, and means for proportioning the volume of air admitted to said make-up duct in accordance with the volume emitted from said nozzle.

3. An air-conditioning section for a composite bake oven embodying an oven compartment, said section comprising a heat source, a blower, a stack conduit, an exhaust gas flue extending from said heat source to said stack conduit, a duct extending from said blower to said heat source and including a portion jacketing the heat source and a portion jacketing the exhaust flue, branch conduits extending from the heat source jacketing portion of said duct adapted to convey heated air to the oven compartment, and a nozzle extending from the flue-jacketing portion of said duct into the flue and directed in the travel path of the exhaust gas.

4. An air-conditioning section for a composite bake oven embodying an oven compartment, said section comprising a heat source, a blower, a stack conduit, an exhaust gas flue extending from said heat source to said stack conduit, a duct extending from said blower to said heat source and including a portion jacketing the heat source and a portion jacketing the exhaust flue, branch conduits extending from the heat source jacketing portion of said duct adapted to convey heated air to the oven compartment, a nozzle extending from the flue-jacketing portion of said duct into the flue and directed in the travel path of the exhaust gas, and a make-up air duct extending from atmosphere to said blower.

5. An air-conditioning section for a composite bake oven embodying an oven compartment, said section comprising a heat source, a blower, a stack conduit, an exhaust gas flue extending from said heat source to said stack conduit, a duct extending from said blower to said heat source and including a portion jacketing the heat source and a portion jacketing the exhaust flue, branch conduits extending from the heat source jacketing portion of said duct adapted to convey heated air to the oven compartment, a duct extending from the intake side of the blower adapted to communicate with the oven compartment, a nozzle extending from the flue-jacketing portion of said duct into the flue and directed in the travel path of the exhaust gas, and a make-up air duct extending from atmosphere to said blower.

References Cited in the file of this patent
UNITED STATES PATENTS

| | | |
|---|---|---|
| 443,516 | Grove | Dec. 30, 1890 |
| 1,243,605 | Howell | Oct. 16, 1917 |
| 1,292,017 | Nelson | Jan. 21, 1919 |
| 1,664,443 | Williams et al. | Apr. 3, 1928 |
| 1,785,763 | Burt | Dec. 23, 1930 |